United States Patent
Charron et al.

(10) Patent No.: US 9,404,421 B2
(45) Date of Patent: Aug. 2, 2016

(54) STRUCTURAL SUPPORT BRACKET FOR GAS FLOW PATH

(71) Applicant: Siemens Energy, Inc., Orlando, FL (US)

(72) Inventors: Richard C. Charron, West Palm Beach, FL (US); William W. Pankey, Palm Beach Gardens, FL (US); Clinton A. Mayer, Jupiter, FL (US); Benjamin G Hettinger, Jupiter, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 353 days.

(21) Appl. No.: 14/161,798

(22) Filed: Jan. 23, 2014

(65) Prior Publication Data

US 2015/0204243 A1    Jul. 23, 2015

(51) Int. Cl.
*F02C 7/20* (2006.01)
*F01D 25/28* (2006.01)
*F01D 9/02* (2006.01)

(52) U.S. Cl.
CPC . *F02C 7/20* (2013.01); *F01D 9/023* (2013.01); *F01D 25/28* (2013.01)

(58) Field of Classification Search
CPC .......... F02C 7/20; F02C 3/14; F05D 2260/30; F23R 3/60; F01D 9/023; F01D 25/28
See application file for complete search history.

(56) References Cited

U.S. PATENT DOCUMENTS

| | | |
|---|---|---|
| 2,594,808 A | 4/1952 | Rubbra |
| 3,007,308 A | 11/1961 | Rahaim et al. |
| 3,670,497 A | 6/1972 | Sheldon |
| 3,750,398 A | 8/1973 | Adelizzi et al. |
| 7,721,547 B2 | 5/2010 | Bancalari et al. |
| 7,909,300 B2 | 3/2011 | Kidder et al. |
| 8,065,881 B2 | 11/2011 | Charron et al. |
| 8,113,003 B2 | 2/2012 | Charron et al. |
| 8,230,688 B2 * | 7/2012 | Wilson ............... F23R 3/425 60/39.37 |
| 8,276,389 B2 * | 10/2012 | Charron ............... F01D 9/023 60/39.37 |
| 2002/0184890 A1 | 12/2002 | Camy et al. |
| 2009/0145137 A1 | 6/2009 | Rizkalla et al. |
| 2010/0180605 A1 | 7/2010 | Charron |
| 2010/0307166 A1 | 12/2010 | Woodcock et al. |
| 2011/0061697 A1 | 3/2011 | Behrenbruch et al. |
| 2011/0259015 A1 | 10/2011 | Johns et al. |
| 2013/0081399 A1 | 4/2013 | Wiebe et al. |

FOREIGN PATENT DOCUMENTS

| | | |
|---|---|---|
| DE | 102009026018 | 12/2009 |
| EP | 2530247 A2 | 12/2012 |

* cited by examiner

*Primary Examiner* — Andrew Nguyen

(57) ABSTRACT

A structural support system is provided in a can annular gas turbine engine having an arrangement including a plurality of integrated exit pieces (IEPs) forming an annular chamber for delivering gases from a plurality of combustors to a first row of turbine blades. A bracket structure is connected between an IEP and an inner support structure on the engine. The bracket structure includes an axial bracket member attached to an IEP and extending axially in a forward direction. A transverse bracket member has an end attached to the inner support structure and extends circumferentially to a connection with a forward end of the axial bracket member. The transverse bracket member provides a fixed radial position for the forward end of the axial bracket member and is flexible in the axial direction to permit axial movement of the axial bracket member.

20 Claims, 4 Drawing Sheets

STRUCTURAL SUPPORT BRACKET FOR GAS FLOW PATH

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates in general to turbine engines and, more particularly, to a support structure for a working gas flow path in a gas turbine engine.

BACKGROUND OF THE INVENTION

A gas turbine engine typically includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of gas passages, conventionally referred to as transition ducts. Within the turbine section are rows of stationary vane assemblies and rotating blade assemblies. The rotating blade assemblies are coupled to a turbine rotor. As the working gases expand through the turbine section, the working gases cause the blade assemblies, and therefore the turbine rotor, to rotate. The turbine rotor may be linked to an electric generator, wherein the rotation of the turbine rotor can be used to produce electricity in the generator.

The gas passages are positioned adjacent to the combustors and route the working gases into the turbine section through a turbine inlet structure associated with a first row of turbine vanes. Because of structural differences between the gas passages and the adjacent turbine structure, they can experience different amounts of thermal growth.

SUMMARY OF THE INVENTION

In accordance with an aspect of the invention, a structural support system is provided in a can annular gas turbine engine having an arrangement for delivering gases from a plurality of combustors to a first row of turbine blades, the arrangement comprising an integrated exit piece (IEP) for each combustor, the IEPs being joined together to form an annular chamber that extends circumferentially and is oriented concentric to a gas turbine engine longitudinal axis for delivering the gas flow to the first row of blades. The structural support system is provided for supporting the arrangement and comprises an inner support structure located axially forward from the arrangement, and a bracket structure having a forward end connected to the inner support structure and having a rearward end connected to a radially inner side of an IEP. The bracket structure includes an axial bracket member having a first end located at the rearward end of the bracket structure and a second end axially aligned with the inner support structure. The second end is located in circumferentially spaced relation to the inner support structure. A transverse bracket member has a first end connected to the second end of the axial bracket member, and has a second end circumferentially spaced from the first end of the transverse bracket member and forming the forward end of the bracket structure attached to the inner support structure.

The axial and transverse bracket members may be formed by respective plates having respective radial inner and outer edges. A plane may be defined by the plate forming the transverse bracket member and the plane of the transverse bracket member may extend generally perpendicular to a plane defined by the plate forming the axial bracket member. The first end of the axial bracket member may include inner and outer attachment locations at respective inner and outer edges of the axial bracket member that are rigidly attached to the IEP.

The IEP may include an inlet chamber for receiving gases from a combustor and further may include a connection segment for connection to an outlet end of an upstream adjacent IEP, the connection segment may include a radially inner wall and a radially outer wall, and the inner and outer attachment locations of the axial bracket member may be connected to the respective inner and outer walls. The connection segment of the IEP may be located radially inward from the inlet chamber. The connection segment of the IEP may have a generally rectangular cross section and a flange may extend outwardly from the inner and outer walls, and the inner and outer attachment locations of the axial bracket member may be attached to the flange.

The transverse bracket member may include two circumferentially spaced attachment locations where the transverse bracket member is rigidly attached to the inner support structure, and the plate forming the transverse bracket member may be rigid in the radial direction and may be flexible in the axial direction.

The inner support structure may be formed by a shaft cover of the gas turbine engine.

The structural support system may further include an outer support structure formed by a turbine vane carrier, and a structural attachment member may extend between and attach a radially outer side of the IEP to the outer support structure.

In accordance with another aspect of the invention, a structural support system is provided in a can annular gas turbine engine having an arrangement for delivering gases from a plurality of combustors to a first row of turbine blades, the arrangement comprising an integrated exit piece (IEP) for each combustor, the IEPs being joined together to form an annular chamber that extends circumferentially and is oriented concentric to a gas turbine engine longitudinal axis for delivering the gas flow to the first row of blades. The structural support system is provided for supporting the arrangement and comprises an inner support structure located axially forward from the arrangement, and a bracket structure having a forward end connected to the inner support structure and having a rearward end connected to a radially inner side of an IEP. The bracket structure includes an axial bracket member having a first end located at the rearward end of the bracket structure and a second end axially aligned with the inner support structure. The second end is located in spaced relation to the inner support structure. A transverse bracket member has a first end connected to the second end of the axial bracket member and has a second end located in spaced relation to the first end of the transverse bracket member and forms the forward end of the bracket structure attached to the inner support structure, wherein the transverse bracket member is flexible in the axial direction and is relatively rigid in the radial direction.

The axial and transverse bracket members may be formed by respective plates, each of the plates may be elongated along a major dimension and may have a shorter minor dimension, and the plates may be joined at a joint that extends in the direction of the minor dimension of each of the plates.

A plane may be defined by the plate forming the transverse bracket member and the plane of the transverse bracket member may extend generally perpendicular to a plane defined by the plate forming the axial bracket member.

The first end of the axial bracket member may include inner and outer attachment locations at respective inner and outer edges of the axial bracket member that are rigidly attached to the IEP.

The IEP may include an inlet chamber for receiving gases from a combustor and further may include a connection segment for connection to an outlet end of an upstream adjacent IEP, the connection segment may include a flange having a radially inner portion and a radially outer portion, and the inner and outer attachment locations of the axial bracket member may be connected to the respective inner and outer portions of the flange.

The connection segment of the IEP may be located radially inward from the inlet chamber.

The connection segment of the IEP may have a generally rectangular cross section and a flange may extend outwardly from the inner and outer walls, and the inner and outer attachment locations of the axial bracket member may be attached to the flange.

The transverse bracket member may include circumferentially spaced attachment locations where the plate forming the transverse bracket member can be rigidly attached to the inner support structure.

The inner support structure may be formed by a shaft cover of the gas turbine engine.

An outer support structure may be formed by a turbine vane carrier, and a structural attachment member may extend between and attach a radially outer side of the IEP to the outer support structure.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

One assembly of a system for delivery of hot working gases from combustors to turbine section of a gas turbine engine, in accordance with an aspect of the invention, orients combustor cans of a gas turbine engine in a tangential arrangement. In particular, combustor cans of a can-annular combustor are each oriented to direct a hot working gas flow through an assembly of components defining gas passages that direct the individual gas flows in a radially inward and circumferentially angled direction into an annular chamber immediately upstream and adjacent a first row of turbine blades in a turbine section of the engine. For example, the arrangement of gas passages providing a flow to an annular chamber may generally correspond to a structure for supplying a flow of gases directly to a first row of turbine blades, without a need for row one turbine vanes, as is described in U.S. Patent Application Publication No 2010/0180605 A1 (U.S. application Ser. No. 12/357,607) to Charron, which application is incorporated herein by reference.

Figure 1:
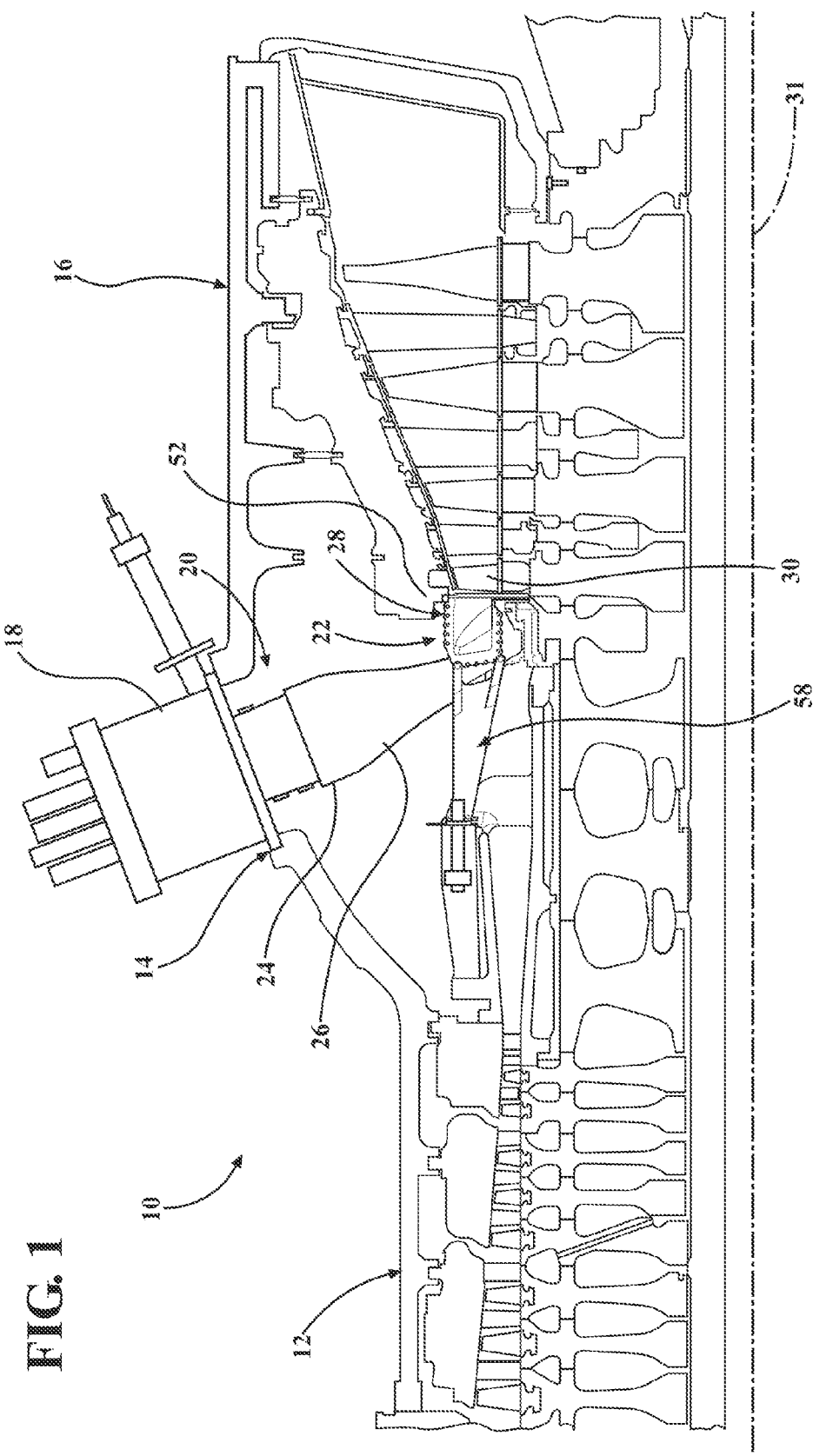
FIG. 1 is a cross-sectional view through a portion of a turbine engine illustrating aspects of the present invention.

Referring to FIG. 1, a gas turbine engine 10 is shown including a compressor section 12, a combustion section 14 and a turbine section 16. The compressor section 12 compresses ambient air and supplies the compressed air to a plurality of combustors 18 in the combustion section 14. In the illustrated embodiment, the combustors 18 comprise can-annular combustors. The combustors 18 combine the compressed air with fuel and ignite the mixture to create combustion products forming a hot working gas flow from each of the combustors 18. The gas flow is conveyed through individual gas paths 20 associated with each of the combustors 18 to an arrangement 22 for delivering the gas flows from the combustors 18 to the turbine section 16. The gas paths 20 can include a cylinder section 24 connected to and receiving the gas flow from a respective combustor 18, and a cone section 26 receiving the gas flow from the cylinder section 24 and conveying the gas flow to an integrated exit piece 28 (hereinafter referred to as an "IEP"). A plurality of IEPs 28 are provided, one for each combustor 18, and the plurality of IEPs are connected to form the arrangement 22 defining an annular structure forward of the turbine section 16. It may be noted that the turbine section 16 does not include a first row of vanes, and the arrangement 22 delivers the gas flow in an aft direction, and oriented circumferentially, directly to a first row of turbine blades 30 in the turbine section 16.

As used herein, "forward" refers to an engine inlet side, and "aft" or "rearward" refers to an engine exhaust side with respect to a longitudinal axis 31 of the gas turbine engine 10. "Inner" and "outer" refer to radial positions with respect to the gas turbine engine longitudinal axis 31. "Upstream" and "downstream" are used with reference to the gas flow direction through the cylinder section 24, cone section 26 and IEP 28.

Figure 4:
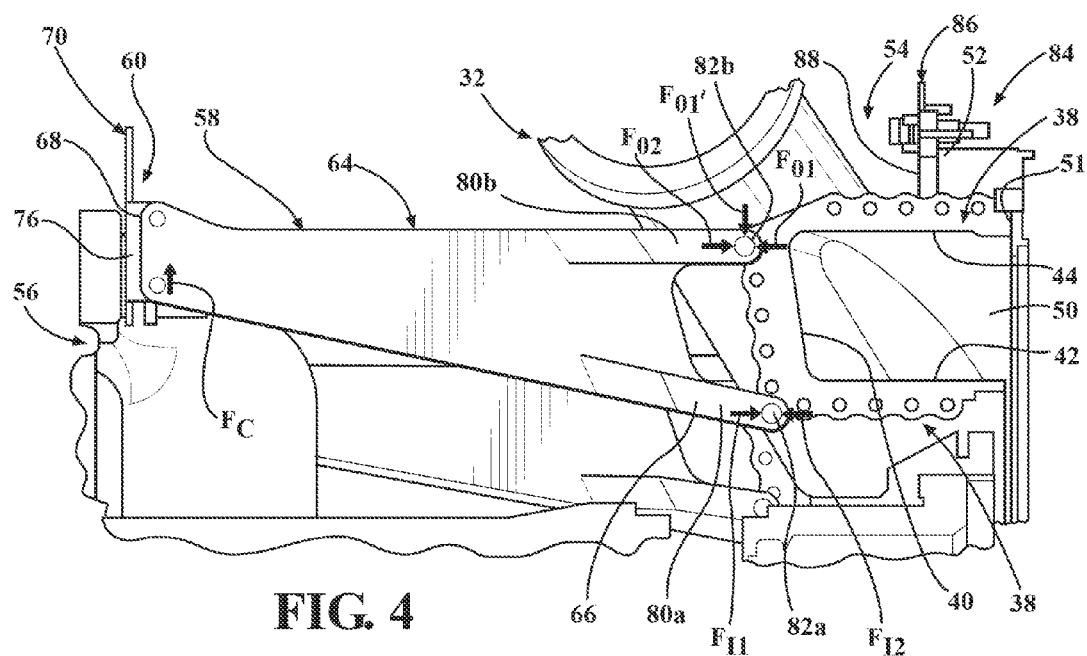
FIG. 4 is a circumferential perspective view illustrating forces that are counteracted by the bracket structure.
Figure 5:
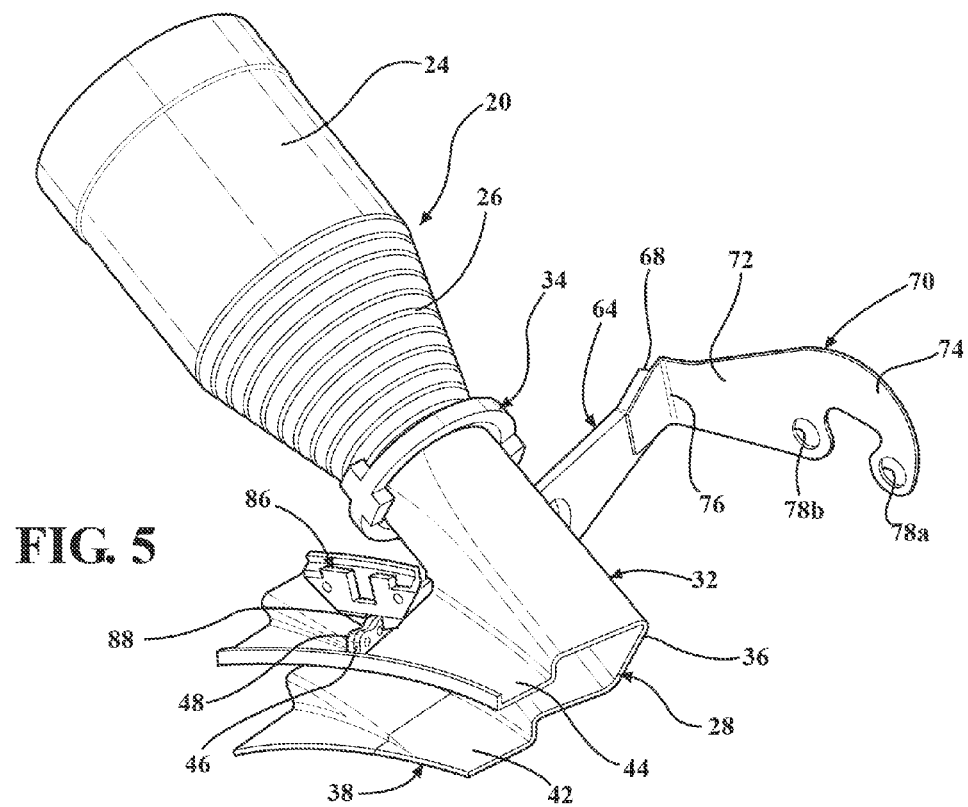
FIG. 5 is a perspective view illustrating an integrated exit piece in association with the bracket structure.

As may be seen in FIG. 5, each IEP 28 can include an inlet chamber 32 having a generally rectangular cross-section, and having an upstream inlet end 34 and a downstream end 36 wherein the upstream end is joined to a downstream end of the cone section 26. A connection segment 38 is formed integrally with the inlet chamber 32 and is located at a radially inner side of the IEP 28. The connection segment 38 has a generally rectangular cross-section and is configured to form a junction with an upstream adjacent IEP 28. In particular, the connection segment 38 includes a radially extending forward wall 40 (FIG. 3), an aft extending inner wall 42 and an aft extending outer wall 44, and a connection flange 46 extends perpendicular from the walls 40, 42, 44. The connection flange 46 is adapted to be connected to a corresponding flange 48 on the downstream end of the inlet chamber 32 of an upstream adjacent IEP 28. It may be understood that the connected IEPs 28 (FIG. 2) form an annular chamber 50 that is open in the aft direction. The annular chamber 50 extends circumferentially and is oriented concentric to the longitudinal axis 31 of the engine, axially adjacent to a forward face 51 of a turbine section vane carrier 52 (FIG. 4), for delivering the gas flow to the first row of blades 30. A description of a known IEP of the type that may be used in combination with the present invention is described in U.S. Pat. No. 8,276,389 to Charron, which patent is incorporated herein by reference.

Figure 2:
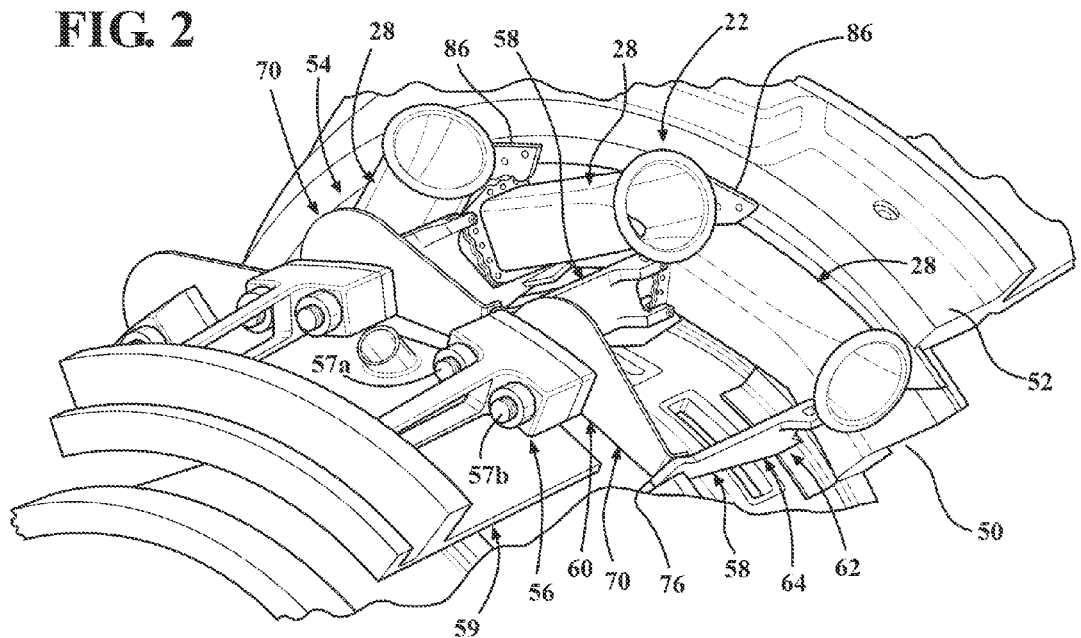
FIG. 2 is a perspective view illustrating a structural support system in accordance with aspects of the invention supporting a portion of an arrangement of integrated exit pieces.

Referring to FIG. 2, in accordance with an aspect of the invention, a structural support system 54 is provided for supporting for the arrangement 22 in a predetermined axial, radial and circumferential location adjacent to the first row of turbine blades 30. The support system 54 includes an inner support structure 56 located axially forward from the arrangement 22, and a bracket structure 58 having a forward end 60 connected to the inner support structure 56 and having a rearward end 62 connected to a radially inner side of an IEP 28, such as is provided at locations on the connection segment 38. In the present embodiment, the inner support structure 56 can be formed by a portion of the shaft cover 59 and particularly including bolts 57a, 57b.

Figure 3:
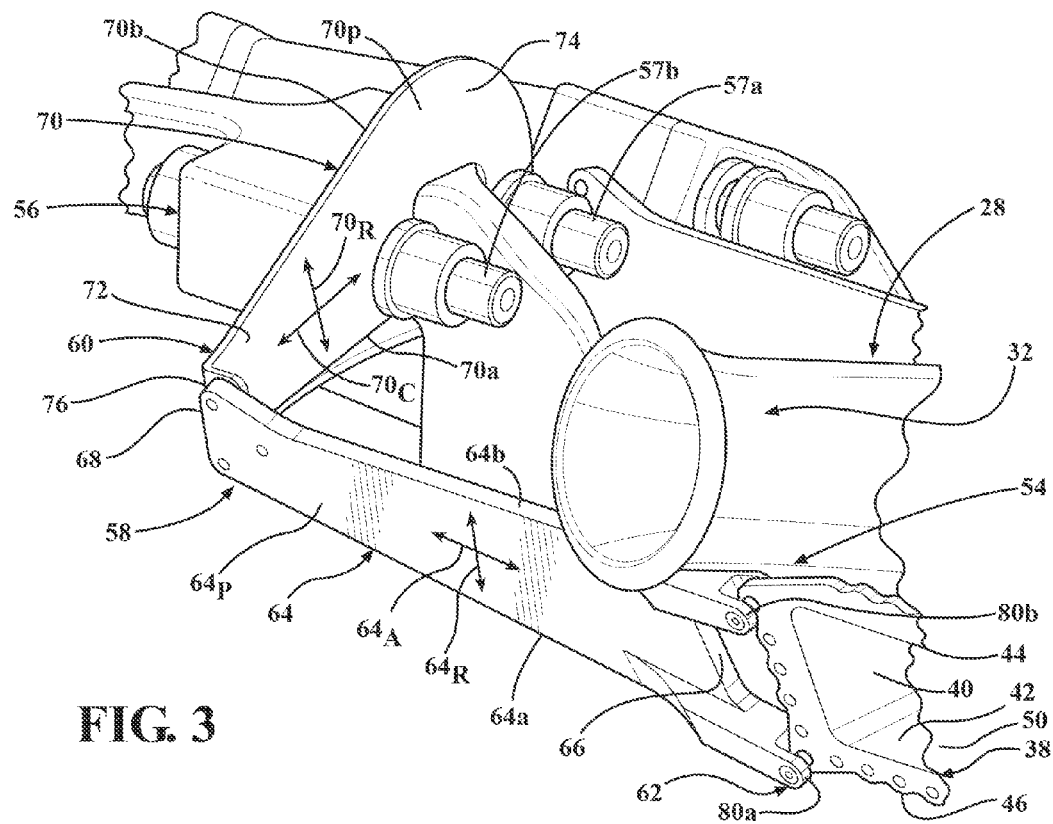
FIG. 3 is an enlarged perspective view of a bracket structure supporting an integrated exit piece.

Referring to FIG. 3, the bracket structure 58 includes an axial bracket member 64 having a first end 66 located at the rearward end 62 of the bracket structure 58 and a second end 68 axially aligned with the inner support structure 56. The axial bracket member 64 has an elongated dimension that extends generally parallel to the longitudinal axis 31 of the engine 10, and the second end 68 of the axial bracket member 64 is located in circumferentially spaced relation to the inner support structure 56.

The bracket structure 58 additionally includes a transverse bracket member 70 having a first end 72 and a second end 74 circumferentially spaced from the first end 72. The first end 72 of the transverse bracket member 70 is connected to the second end 68 of the axial bracket member 64. The second end 74 of the transverse bracket member 70 forms a portion of the forward end 60 of the bracket structure 58 attached to the inner support structure 56.

The axial bracket member 64 is formed as a substantially rigid plate $64p$ having radially spaced inner and outer edges $64a$, $64b$, wherein the plate $64_P$ forming the axial bracket member 64 is substantially resistant to bending forces applied in all directions to the plate $64_P$. The transverse bracket member 70 is formed of a thinner material thickness than the axial bracket member 64, and can be formed as a relatively flexible plate $70_P$ having radially spaced inner and outer edges $70a$, $70b$. For example, the transverse bracket member 70 may be formed of one or more layers of sheet metal material wherein fewer or more sheets of material can be provided to increase or decrease the flexibility of the transverse bracket member 70. The transverse bracket member plate $70_P$ is flexible in the axial direction transverse to the plane of the plate $70_P$, wherein, in comparison to each other, the axial bracket member plate $64_P$ is relatively rigid and the transverse bracket member plate $70_P$ is relatively flexible. As will be discussed further below, the axial bracket members 64 are configured to resist torque or twisting forces that are created at the IEPs 28, which forces are counteracted at the inner support structure 56, and the transverse bracket members 70 are configured to flex in order to accommodate differential axial movement between the IEPs 28 and the inner support structure 56, i.e., at the shaft cover 59.

In accordance with an aspect of the invention, the plane defined by the plate $64_P$ forming the axial bracket member 64 can be defined by an intersection of lines $64_C$, $64_R$ that extend circumferentially and radially, respectively, and the plane defined by the plate $70_P$ forming the transverse bracket member 70 can be defined by an intersection of lines $70_C$, $70_R$ that extend circumferentially and radially, respectively. The axially extending line $64_A$ defines a major dimension of elongation for the axial bracket member 64, and the radially extending line $64_R$ defines a shorter minor dimension for the axial bracket member 64. The circumferentially extending line $70_C$ defines a major dimension of elongation for the transverse bracket member 70, and the radially extending line $70_R$ defines a shorter minor dimension for the transverse bracket member 70.

The plane defined by the plate $70_P$ of the transverse bracket member 70 extends generally perpendicular to the plane defined by the plate $64_P$ forming the axial bracket member 64, and the axial and transverse bracket members 64, 70 are joined at joint 76 that extends radially parallel the direction of the minor dimensions $64_R$, $70_R$ of the plates $64_P$, $70_P$. Hence, the bracket structure 58 is configured as an L-shaped structure in which the axial bracket member 64 extends from an IEP 28 forward to the axial location of the inner support structure 56, and the transverse bracket member 70 extends circumferentially from the joint 76 to an attachment location on the inner support structure 56.

In the illustrated embodiment, the transverse bracket member 70 includes two circumferentially spaced attachment locations 78a, 78b (FIG. 5) where the transverse bracket member 70 is rigidly attached to the inner support structure 56. The attachment locations 78a, 78b are defined by holes through the second end 74 of the transverse bracket member 70 for receiving the respective bolts 57a, 57b (FIG. 3). The second end 74, spanning the bolts 57a, 57b, is rounded radially outwardly and forms the transverse bracket member 70 as a rigid structure in the radial (in plane) direction to resist forces applied in the radial direction to the first end 72 of the transverse bracket member 70, i.e. to prevent radial movement of the first end 72 of the transverse bracket member 70.

Referring to FIG. 3, the first end 66 of the axial bracket member 64 is formed as a forked or bifurcated structure having inner and outer arms 80a, 80b at the inner and outer edges 64a, 64b of the axial bracket member 64. The inner arm 80a defines an inner attachment location 82a, and the outer arm 80b defines an outer attachment location 82b. The inner and outer attachment locations 82a, 82b are rigidly attached to the IEP 28. Specifically, the first end 66 of the axial bracket member 64 is located radially inward from the inlet chamber 32 and extends to the flange 46 on the connection segment 38. The inner attachment location 82a is rigidly affixed, such as by a bolt, to the flange 46 adjacent to the inner wall 42 of the connection segment 38, and the outer attachment location 82b is rigidly affixed, such as by a bolt, to the flange 46 adjacent to the outer wall 44 of the connection segment 38.

Referring to FIGS. 4 and 5, the structural support system 54 additionally includes an outer support structure 84 formed by the turbine section vane carrier 52. The structural support system also includes a plurality of structural attachment members 86, wherein each structural attachment member 86 extends between the outer support structure 84 and the connection flange 46 of an IEP 28, adjacent to the outer wall 44 of the connection segment 38. Each structural attachment member 86 is formed as a clevis clamp, including a bifurcated end 88 defining a slot for receiving the connection flange 46 and a corresponding flange 48 on an adjacent IEP 28, as illustrated in FIG. 5. The engagement of the flanges 46, 48 within the bifurcated end 88 of the attachment member 86 comprises a radial sliding engagement that prevents circumferential movement of the IEPs 28, while permitting radial movement of the IEPs 28 relative to the vane carrier 52, such as to accommodate differential thermal growth between the vane carrier 52 and the ring formed by the IEPs 28.

Referring to FIG. 4, the gas flow through the IEPs 28 and passing out of the annular chamber 50 produces a forward directed force $F_{O1}$ and a radially inward directed force $F_{O1'}$ on the radially outer portion of the connection segment 38, and produces an aft directed force $F_{I1}$ on the radially inner portion of the connection segment 38. As a result, the forces on the IEP 28 tend to rotate the IEP 28 in a counterclockwise direction, as seen in FIG. 4. A counteracting aft directed force $F_{O2}$ is applied by the outer arm 80b of the axial bracket member 64 at or adjacent to the outer wall 44 of the connection segment 38, and a counteracting forward directed force $F_{I2}$ is applied by the inner arm 80a of the axial bracket member 64 at or adjacent to the inner wall 42 of the connection segment 38. The axial bracket member 64 is maintained in a generally fixed vertical position by the transverse bracket member 70 which, as described above, includes a first end 72 that is maintained at a fixed radial position at the joint 76 where it is joined to the second end 68 of the axial bracket member 64. The transverse bracket member 70 provides a counteracting force $F_C$ to prevent vertical movement of the first end 66 of the axial bracket member 64. It may be understood that the axial bracket member 64 is formed with sufficient rigidity to resist any distortion due to the forces applied at the opposing ends 66, 68 of the axial bracket member 64.

While the transverse member 70 provides a rigid structure that is immovable in the radial direction, and the transverse member 70 additionally maintains a biasing force in the aft direction to bias the IEP 28 toward engagement with the vane carrier 52, the transverse member 70 is flexible in the axial direction. Hence, relative movement may occur between the inner support structure 56 and the outer support structure 84, and it may be understood that the transverse member 70 can flex to accommodate such relative movement in order to limit the axial forces transmitted to the IEP 28 through the axial bracket member 64.

Figure 6:
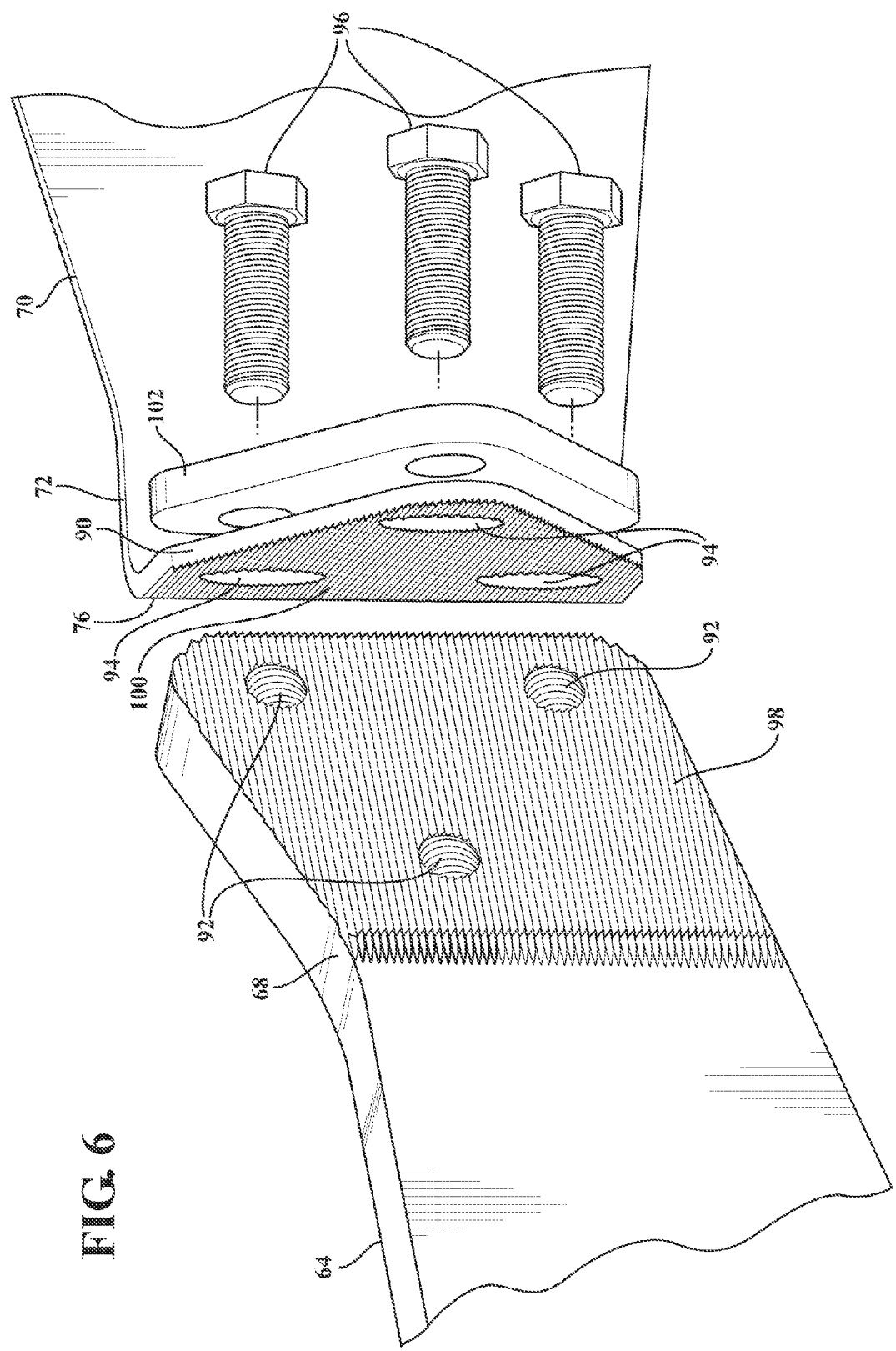
FIG. 6 illustrates details of an attachment between an axial bracket member and a transverse bracket member of the bracket structure.

Referring to FIG. 6, details of a connection between the axial bracket member 64 and the transverse bracket member 70 are illustrated. In particular, an adjustable connection may be provided between the second end 68 of the axial bracket member 64 and an end tab 90 that extends axially from the joint 76 at the first end 72 of the transverse bracket member 70. The second end 68 of the axial bracket member 64 includes holes 92 that are aligned with corresponding holes 94 in the end tab 90, and bolts 96 extend through the holes 92, 94 to attach the ends 68, 72 of the axial and transverse bracket members 64, 70 together.

The holes 94 can be formed as elongated slots that permit a radial adjustment between the second end 68 of the axial bracket member 64 and the first end 72 of the transverse bracket member 70. It may be understood that a tolerance accumulation of engine parts in the area of the support system 54 can cause variations in the relative radial positions between the IEP 28 and the forward end 60 of the bracket structure 58, and elongated slots defined by the holes 94 enable the bracket structure 58 to be adjusted for a particular installation. Further, the cooperating surfaces of the second end 68 of the axial bracket member 64 and the end tab 90 of the transverse bracket member 70 can be formed with respective serrations 98, 100 sized to engage with each other in order to lock the axial bracket member end 68 in engagement with the end tab 90 and resist relative movement. A stiffener plate 102 can be provided on a side of the end tab 90 opposite from the axial bracket member 64 to facilitate resistance to distortion at the end tab 90 and maintain adequate engagement between the teeth of the serrations 98, 100. It should be understood that, although serrations 98, 100 are described for the present embodiment, alternative forms of engagement structure may be provided to resist relative movement between the axial bracket member end 68 and the end tab 90.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A structural support system for a can annular gas turbine engine having an arrangement for delivering gases from a plurality of combustors to a first row of turbine blades, the arrangement comprising an integrated exit piece (IEP) for each combustor, the IEPs being joined together to form an annular chamber that extends circumferentially and is oriented concentric to a gas turbine engine longitudinal axis for delivering a gas flow to the first row of blades, the structural support system for the arrangement comprising:
    an inner support structure located axially forward from the arrangement;
    a bracket structure having a forward end connected to the inner support structure and having a rearward end connected to a radially inner side of a respective IEP of the plurality of IEPs, the bracket structure including:
        an axial bracket member having a first end located at the rearward end of the bracket structure and a second end axially aligned with the inner support structure, and the second end being located in circumferentially spaced relation to the inner support structure; and
        a transverse bracket member having a first end connected to the second end of the axial bracket member and having a second end circumferentially spaced from the first end of the transverse bracket member and forming the forward end of the bracket structure attached to the inner support structure.

2. The structural support system of claim 1, wherein the axial and transverse bracket members are formed by respective plates having respective radial inner and outer edges.

3. The structural support system of claim 2, wherein a plane is defined by the plate forming the transverse bracket member and the plane of the transverse bracket member extends generally perpendicular to a plane defined by the plate forming the axial bracket member.

4. The structural support system of claim 2, wherein the first end of the axial bracket member includes inner and outer attachment locations at respective inner and outer edges of the axial bracket member that are rigidly attached to the respective IEP.

5. The structural support system of claim 4, wherein the respective IEP includes an inlet chamber for receiving gases from a respective combustor of the plurality of combustors and further includes a connection segment for connection to an outlet end of an upstream adjacent respective IEP, the connection segment including a radially inner wall and a radially outer wall, and the inner and outer attachment locations of the axial bracket member being connected to the respective inner and outer walls.

6. The structural support system of claim 5, wherein the connection segment of the respective IEP is located radially inward from the inlet chamber.

7. The structural support system of claim 5, wherein the connection segment of the respective IEP has a generally rectangular cross section and a flange extends outwardly from the inner and outer walls, and the inner and outer attachment locations of the axial bracket member are attached to the flange.

8. The structural support system of claim 2, wherein the transverse bracket member includes two circumferentially spaced attachment locations where the transverse bracket member is rigidly attached to the inner support structure, and the plate forming the transverse bracket member is rigid in the radial direction and is flexible in the axial direction.

9. The structural support system of claim 1, wherein the inner support structure is formed by a shaft cover of the gas turbine engine.

10. The structural support system of claim 1, including an outer support structure formed by a turbine vane carrier, and a structural attachment member extending between and attaching a radially outer side of the respective IEP to the outer support structure.

11. A structural support system for a can annular gas turbine engine having an arrangement for delivering gases from a plurality of combustors to a first row of turbine blades, the arrangement comprising an integrated exit piece (IEP) for each combustor, the IEPs being joined together to form an annular chamber that extends circumferentially and is oriented concentric to a gas turbine engine longitudinal axis for delivering a gas flow to the first row of blades, the structural support system for the arrangement comprising:
  an inner support structure located axially forward from the arrangement;
  a bracket structure having a forward end connected to the inner support structure and having a rearward end connected to a radially inner side of a respective IEP of the plurality of IEPs, the bracket structure including:
    an axial bracket member having a first end located at the rearward end of the bracket structure and a second end axially aligned with the inner support structure, and the second end being located in spaced relation to the inner support structure; and
    a transverse bracket member having a first end connected to the second end of the axial bracket member and having a second end located in spaced relation to the first end of the transverse bracket member and forming the forward end of the bracket structure attached to the inner support structure, wherein the transverse bracket member is flexible in the axial direction and is relatively rigid in the radial direction.

12. The structural support system of claim 11, wherein the axial and transverse bracket members are formed by respective plates, each of the plates being elongated along a major dimension and having shorter minor dimension, and the plates being joined at a joint that extends in the direction of the minor dimension of each of the plates.

13. The structural support system of claim 12, wherein a plane is defined by the plate forming the transverse bracket member and the plane of the transverse bracket member extends generally perpendicular to a plane defined by the plate forming the axial bracket member.

14. The structural support system of claim 12, wherein the first end of the axial bracket member includes inner and outer attachment locations at respective inner and outer edges of the axial bracket member that are rigidly attached to the respective IEP.

15. The structural support system of claim 14, wherein the respective IEP includes an inlet chamber for receiving gases from a respective combustor of the plurality of combustors and further includes a connection segment for connection to an outlet end of an upstream adjacent respective IEP, the connection segment including a flange having a radially inner portion and a radially outer portion, and the inner and outer attachment locations of the axial bracket member being connected to the respective inner and outer portions of the flange.

16. The structural support system of claim 15, wherein the connection segment of the respective IEP is located radially inward from the inlet chamber.

17. The structural support system of claim 15, wherein the connection segment of the respective IEP has a generally rectangular cross section and a flange extends outwardly from the inner and outer walls, and the inner and outer attachment locations of the axial bracket member are attached to the flange.

18. The structural support system of claim 12, wherein the transverse bracket member includes circumferentially spaced attachment locations where the plate forming the transverse bracket member is rigidly attached to the inner support structure.

19. The structural support system of claim 11, wherein the inner support structure is formed by a shaft cover of the gas turbine engine.

20. The structural support system of claim 11, including an outer support structure formed by a turbine vane carrier, and a structural attachment member extending between and attaching a radially outer side of the respective IEP to the outer support structure.

* * * * *